(12) United States Patent
Wu et al.

(10) Patent No.: US 8,669,725 B2
(45) Date of Patent: Mar. 11, 2014

(54) FAN CONTROL SYSTEM CAPABLE OF MODULATING A ROTATIONAL SPEED OF A FAN AND METHOD THEREOF

(75) Inventors: Ming-Chang Wu, Taipei Hsien (TW);
Chih-An Liao, Taipei Hsien (TW);
Chuan-Yi Liang, Taipei Hsien (TW);
Yi-Jiun Lin, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 650 days.

(21) Appl. No.: 12/882,179

(22) Filed: Sep. 14, 2010

(65) Prior Publication Data
US 2011/0199034 A1 Aug. 18, 2011

(30) Foreign Application Priority Data
Feb. 12, 2010 (TW) .............................. 99104675 A

(51) Int. Cl.
*H02P 1/00* (2006.01)
(52) U.S. Cl.
USPC ........................... 318/268; 318/280; 318/599
(58) Field of Classification Search
USPC ............ 318/268, 280, 599, 400.01, 610, 799, 318/400.07, 400.12, 400.14, 400.29, 400.4, 318/432, 721, 779, 804, 811; 388/811, 819; 700/25, 296, 299, 300, 304
See application file for complete search history.

(56) References Cited

U.S. PATENT DOCUMENTS

| 2007/0047199 A1* | 3/2007 | Tsutsui ........................ 361/687 |
| 2007/0081800 A1* | 4/2007 | Hsiang et al. ................. 388/811 |
| 2007/0098374 A1* | 5/2007 | Fujiwara ....................... 388/811 |
| 2009/0145376 A1 | 6/2009 | Okuda |

FOREIGN PATENT DOCUMENTS

| CN | 101063887 A | 10/2007 |
| CN | 101253315 A | 8/2008 |

OTHER PUBLICATIONS

Office action mailed on Jun. 3, 2013 for the China application No. 201019185039.4, p. 3~8.

* cited by examiner

*Primary Examiner* — Karen Masih
(74) *Attorney, Agent, or Firm* — Winston Hsu; Scott Margo

(57) ABSTRACT

A fan control system includes a host device including a detecting unit for detecting a component so as to generate a detecting signal. The host device further includes BIOS for storing relationship information between the detecting signal and a rotational speed of a fan and for generating a rotational signal according to the detecting signal and the relationship information. The fan control system further includes a fan device including a fan and a fan driving unit for driving the fan. The fan device further includes a rotational speed modulating unit for controlling the fan driving unit to drive the fan to rotate at a second rotational speed outside a first range when a first rotational speed corresponding to the rotational signal according to the relationship information is within the first range.

20 Claims, 6 Drawing Sheets

| Temperature detecting signal(° C) | 50 | 52 | 54 | 56 | 58 | 60 | 62 | 64 | 66 | 68 | 70 |
|---|---|---|---|---|---|---|---|---|---|---|---|
| Duty cycle (%) | 50 | 55 | 60 | 65 | 70 | 75 | 80 | 85 | 90 | 95 | 100 |
| Rotational speed (RPM) | 1000 | 1100 | 1200 | 1300 | 1400 | 1500 | 1600 | 1700 | 1800 | 1900 | 2000 |

FIG. 2 PRIOR ART

FAN CONTROL SYSTEM CAPABLE OF MODULATING A ROTATIONAL SPEED OF A FAN AND METHOD THEREOF

BACKGROUND OF THE INVENTION

1. Field of the Invention

The present invention relates to a fan control system capable of modulating a rotational speed of a fan and a method thereof, and more specifically, to a fan control system capable of modulating a rotational speed of a fan to prevent specific resonance frequency and the method thereof.

2. Description of the Prior Art

Electronics technology changes on a daily basis with new advances, so functions of consumer electronic products get more and more diversified, and requests for efficiency get higher and higher. However, high efficiency means high energy-consuming, and it may cause problems of resonance, noise, and heat dissipating. If heat generated by inner components of electronic products can not be dissipated efficiently, it will affect stability and efficiency of operation of electronic products. It even may result in mechanical malfunction cause damage. The conventional solution is to dispose fans on heat sources to decrease temperature thereof, so as to make electronic products work normally.

A pulse width modulation (PWM) fan is usually used in all kinds of computer systems for dissipating heat generated by inner components. The feature of the PWM fan is its linear modulation from low rotational speed to high rotational speed. Taiwan Patent No. 494184 discloses a fan control mechanism of utilizing a single chip to control the rotational speed of the fan by linearly modulation. Please refer to FIG. 1, FIG. 1 is a diagram showing relationship between a rotational speed of a PWM fan and a duty cycle of a PWM signal in the prior art. The modulation of the rotational speed of the PWM fan is according to the operation curve of the rotational speed of the fan as shown in FIG. 1. The operation curve of the rotational speed of the fan integrates the measured result of system noise and heat transfer, and complies with the customer's specification so as to generate the optimal operation curve of the rotational speed of the fan. The optimal operation curve of the rotational speed of the fan can be stored in a basic input/output system (BIOS). A temperature detecting unit is for detecting temperature of a CPU or a key component so as to generate a temperature detecting signal to the BIOS. Afterwards, the BIOS generates the signal of the rotational speed according to the temperature detecting signal to the PWM control chip of the fan, and the fan responses a correct rotational speed. By modulating the duty cycle of the PWM signal, an analog signal is encoded, and the current is added on an analog loading with repeating pulse sequence of on and off. For example, 12V DC power supply becomes a step-down power voltage 3.6V via PWM modulation of 30% duty cycle. Accordingly, different duty cycles are corresponding to different rotational speeds.

Please refer to FIG. 2. FIG. 2 is a relationship table of temperature detecting signals, rotational speeds, and duty cycles of the PWM signal in the prior art. Since the rotational speeds are linear with temperature detecting signals and duty cycles of the PWM signal of FIG. 1 and FIG. 2, each temperature point is corresponding to a fixed rotational speed. However, the operational rotational speeds of the fan cover a very wide distribution range, it may cause resonance due to overlap between vibration frequency of the fan in some specific rotational speeds and natural frequency of a computer casing or of vibration frequency of the fan coupling with the rotational frequency of a hard disk. If resonance between the fan and the casing occurs, it may result in the following problems. It may cause unpleasant resonance sound. Acoustic pressure, acoustic power, acoustic quality may fail to qualify the test specification. It may increase manufacture cost due to structural modification of the casing or changing natural frequency of the casing to improve resonance. It may need modifying mold or remolding due to modification of the casing, and it results in postponement of mass production. If resonance between the fan and the hard disk occurs, it may result in the following problems. It may decrease reading/writing rate of a head of the hard disk, and the head of the hard disk may even be unable to write and read so that the reading/writing rate for the head failing to qualify the test specification. Furthermore, service life of the hard disk may be reduced. In conclusion, it is an important issue to design a fan control mechanism capable of modulating the rotational speed of the fan to prevent specific resonance frequency.

SUMMARY OF THE INVENTION

The present invention provides a fan control system capable of modulating a rotational speed of a fan to prevent specific resonance frequency and the method thereof to solve the problems mentioned above.

According to the claimed invention, the fan control system includes a host device including a detecting unit for detecting a component so as to generate a detecting signal. The host device further includes a BIOS coupled to the detecting unit for storing relationship information between the detecting signal and a rotational speed of a fan and for generating a rotational signal according to the detecting signal and the relationship information. The fan control system further includes an output interface coupled to the BIOS for transmitting the rotational signal. The fan control system further includes a fan device coupled to the output interface, and the fan device includes a fan and a fan driving unit for driving the fan. The fan device further includes a rotational speed modulating unit for controlling the fan driving unit to drive the fan to rotate at a second rotational speed outside a first range when a first rotational speed corresponding to the rotational signal according to the relationship information is within the first range.

According to the claimed invention, the detecting unit is a temperature detecting unit for detecting temperature of the component so as to generate a temperature detecting signal.

According to the claimed invention, the rotational signal is a pulse width modulation (PWM) signal with a duty cycle.

According to the claimed invention, the BIOS generates the PWM signal with the duty cycle according to the detecting signal and the relationship information.

According to the claimed invention, the rotational speed modulating unit controls the fan driving unit to drive the fan to rotate at the second rotational speed when the duty cycle of the PWM signal is within a duty cycle range corresponding to two boundary values of the first range.

According to the claimed invention, the second rotational speed is corresponding to one of the two boundary values of the first range.

According to the claimed invention, the BIOS stores the relationship information of the detecting signal, the rotational speed, and the duty cycle of the PWM signal.

According to the claimed invention, the rotational speed modulating unit is a micro controller unit (MCU).

According to the claimed invention, a fan control system includes a host device including a detecting unit for detecting a component so as to generate a detecting signal. The fan control system includes a rotational speed modulating unit coupled to the detecting unit for storing relationship information between the detecting signal and a rotational speed and for generating a rotational signal when the rotational speed corresponding to the detecting signal according to the relationship information is within a first range. The fan control system includes a fan device coupled to the rotational speed modulating unit. The fan device includes a fan, a fan driving unit for driving the fan, and a fan controlling unit for controlling the fan driving unit to drive the fan to rotate at a second rotational speed outside the first range according to the rotational signal generated by the rotational speed modulating unit.

According to the claimed invention, the rotational speed modulating unit generates the PWM signal with a duty cycle according to the detecting signal and the relationship information, and the duty cycle of the PWM signal is outside a duty cycle range corresponding to the first range.

According to the claimed invention, the rotational speed modulating unit stores the relationship information of the detecting signal, the rotational speed, and the duty cycle of the PWM signal.

According to the claimed invention, the rotational speed modulating unit is a baseboard management controller (BMC).

According to the claimed invention, a method for modulating a rotational speed of a fan, the method includes a detecting unit detecting a component so as to generate a detecting signal; generating a rotational signal when a first rotational speed corresponding to the detecting signal is within a first range; and driving a fan to rotate at a second rotational speed according to the rotational signal, wherein the second rotational speed is outside the first range.

According to the claimed invention, the detecting unit detecting the component so as to generate the detecting signals includes the detecting unit detecting temperature of the component so as to generate a temperature detecting signal.

According to the claimed invention, the method further includes driving the fan to rotate at the second rotational speed when the duty cycle of the PWM signal is within a duty cycle range corresponding to two boundary values of the first range.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a relationship table of temperature detecting signals, rotational speeds, and duty cycles of the PWM signal in the prior art.

DETAILED DESCRIPTION

Figure 1:
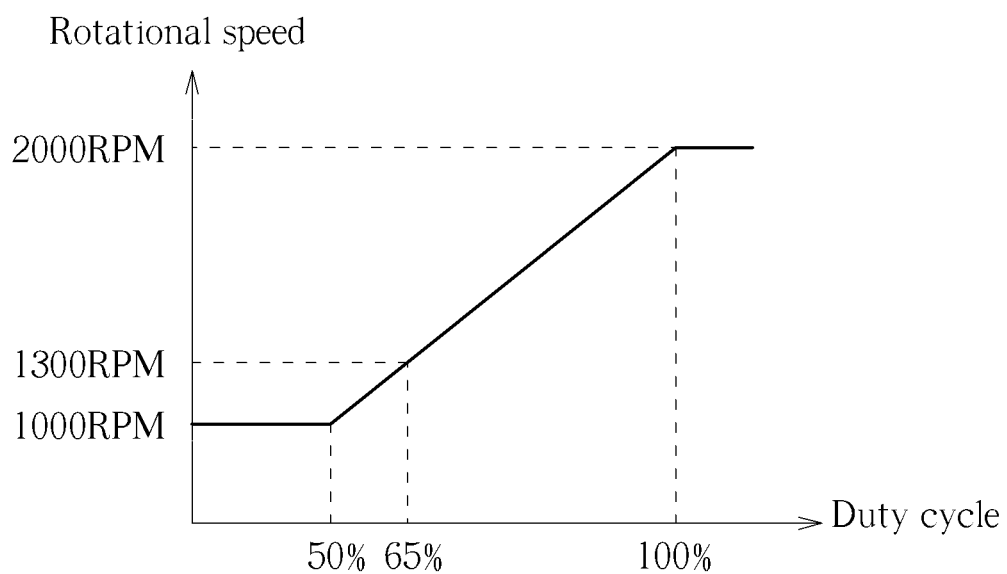
FIG. 1 is a diagram showing relationship between a rotational speed of a PWM fan and a duty cycle of a PWM signal in the prior art.
Figure 3:
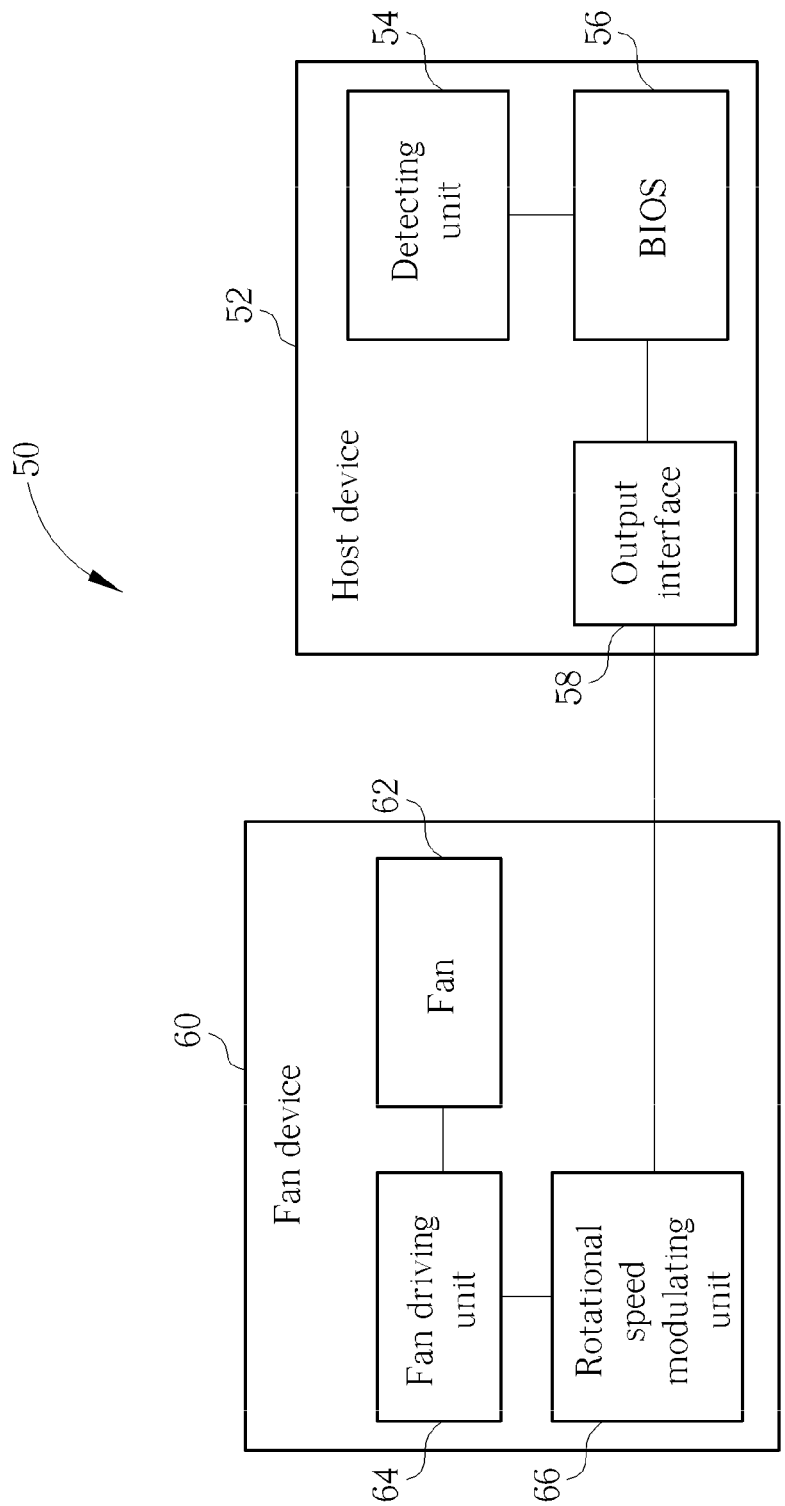
FIG. 3 is a functional block diagram of a fan control system according to a first embodiment of the present invention.

Please refer to FIG. 3. FIG. 3 is a functional block diagram of a fan control system 50 according to a first embodiment of the present invention. The fan control system 50 includes a host device 52, and the host device 52 can be a computer host. The host device 52 includes a detecting unit 54 for detecting a component so as to generate a detecting signal. For example, the detecting unit 54 can be a temperature detecting unit for detecting temperature of the component so as to generate a temperature detecting signal. The host device 52 further includes a BIOS 56 coupled to the detecting unit 54 for storing relationship information between the detecting signal and a rotational speed of a fan 62 and for generating a rotational signal according to the detecting signal and the relationship information. The relationship information can be the relationship information as shown in FIG. 1 and FIG. 2, and the rotational signal can be a pulse width modulation (PWM) signal. The host device 52 further includes an output interface 58 coupled to the BIOS 56 for outputting the rotational signal, and the output interface 58 can be a super I/O interface and so on. The fan control system 50 further includes a fan device 60 for dissipating heat generated by inner components of the host device 52. The fan device 60 is coupled to the output interface 58. The fan device 60 includes a fan 62 and a fan driving unit 64 for driving the fan 62. The fan driving unit 64 can be a motor. The fan device 60 further includes a rotational speed modulating unit 66 for modulating the rotational speed of the fan 62 and generating the detecting signal so as to control the fan driving unit 64 to drive the fan 62. The rotational speed modulating unit 66 can be a micro controller unit (MCU).

Figure 4:
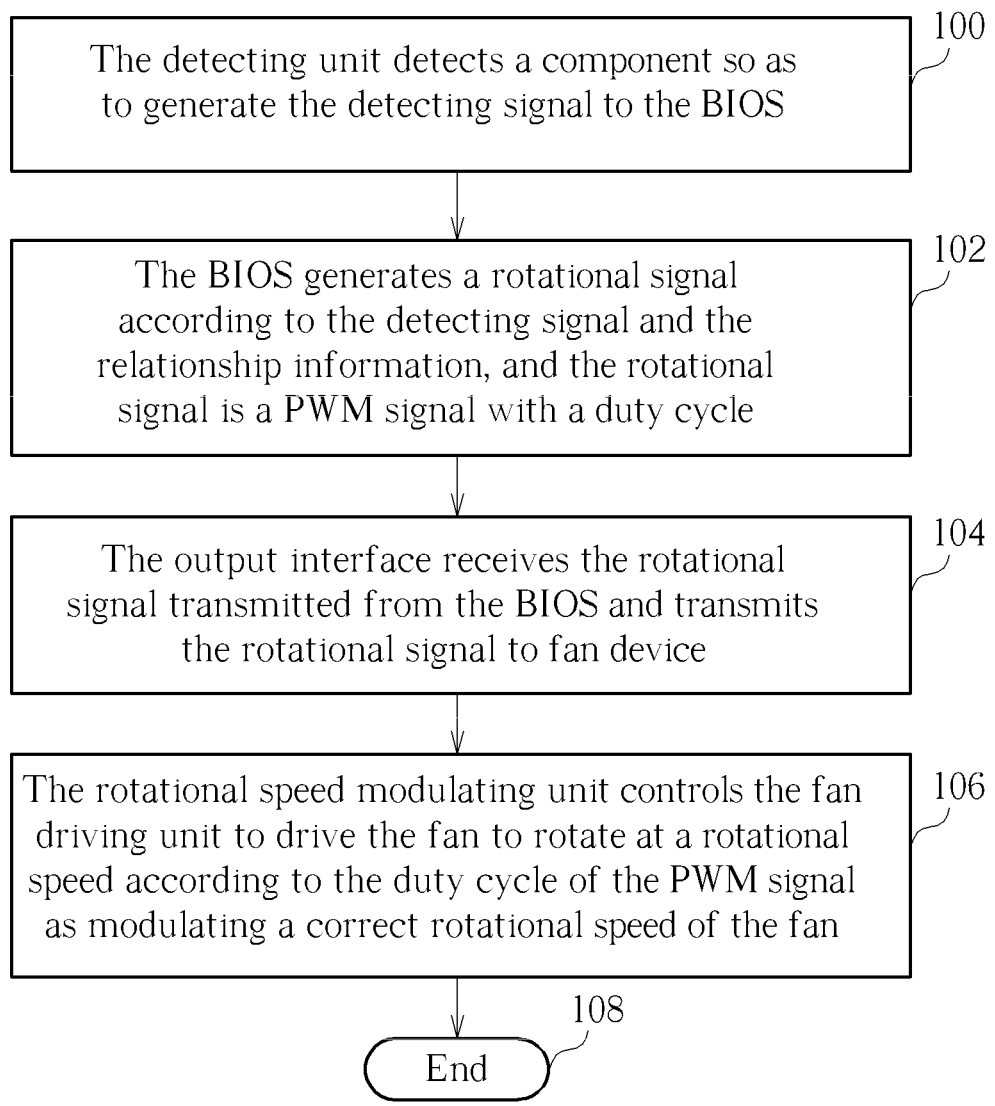
FIG. 4 is a flowchart of the fan control system modulating a rotational speed of the present invention.

The method of modulating the rotational speed by the fan control system 50 is introduced herein. Please refer to FIG. 4. FIG. 4 is a method of the fan control system 50 modulating the rotational speed according to the first embodiment of the present invention. The method includes following steps:

Step 100: The detecting unit 54 detects a component so as to generate the detecting signal to the BIOS 56.

Step 102: The BIOS 56 generates a rotational signal according to the detecting signal and the relationship information, and the rotational signal is a PWM signal with a duty cycle.

Step 104: The output interface 58 receives the rotational signal transmitted from the BIOS 56 and transmits the rotational signal to fan device 60.

Step 106: The rotational speed modulating unit 66 controls the fan driving unit 64 to drive the fan 62 to rotate at a rotational speed according to the duty cycle of the PWM signal as modulating a correct rotational speed of the fan 62.

Step 108: End.

More detailed description for the steps mentioned above will be provided. The detecting unit 54 detects the component so as to generate the detecting signal to the BIOS 56. For example, the detecting unit 54 can be the temperature detecting unit for detecting temperature of a CPU or a key component so as to generate the temperature detecting signal. After the BIOS 56 receives the detecting signal, the BIOS 56 can generate the rotational signal according to the detecting signal and the relationship information. For example, the BIOS 56 stores the relationship information of the detecting signal, the rotational speed, and the duty cycle of the PWM signal, i.e. the relationship information can be the linear relationship as shown in FIG. 2, and each temperature is corresponding to a fixed rotational speed, such that the BIOS 56 can generate the PWM signal with the corresponding duty cycle according to the temperature detecting signal. Next, the output interface 58 can receive the PWM signal with the duty cycle transmitted from the BIOS 56 and generate the PWM signal to the rotational speed modulating unit 66. Afterward, the rotational speed modulating unit 66 controls the fan driving unit 64 to drive the fan 62 to rotate at the rotational speed according to the duty cycle of the PWM signal as modulating the correct rotational speed of the fan 62. Please note that some specific rotational speeds can be predetermined to prevent resonance due to overlap between vibration frequency of the fan in some specific rotational speeds and natural frequency of a computer casing or of vibration frequency of the fan coupling with the rotational frequency of a hard disk. For example, when the resonance rotational speed to be precluded is within a first range, the operational rotational speed of the fan is set outside the first range, such as outside the upper and lower 10% range of the resonance rotational speed. When a first rotational speed corresponding to the detecting signal is within a first range, the rotational speed modulating unit 66 can modulate the rotational speed to be outside the first range, such as controlling the fan driving unit 64 to drive the fan 62 to rotate at a second rotational speed, wherein the second rotational speed is outside the first range. For example, when the duty cycle of the PWM signal is within a duty cycle range corresponding to two boundary values of the first range, the fan driving unit 64 can drive the fan 62 to rotate at the second rotational speed, and the second rotational speed is corresponding to one of the two boundary values of the first range.

Figure 5:
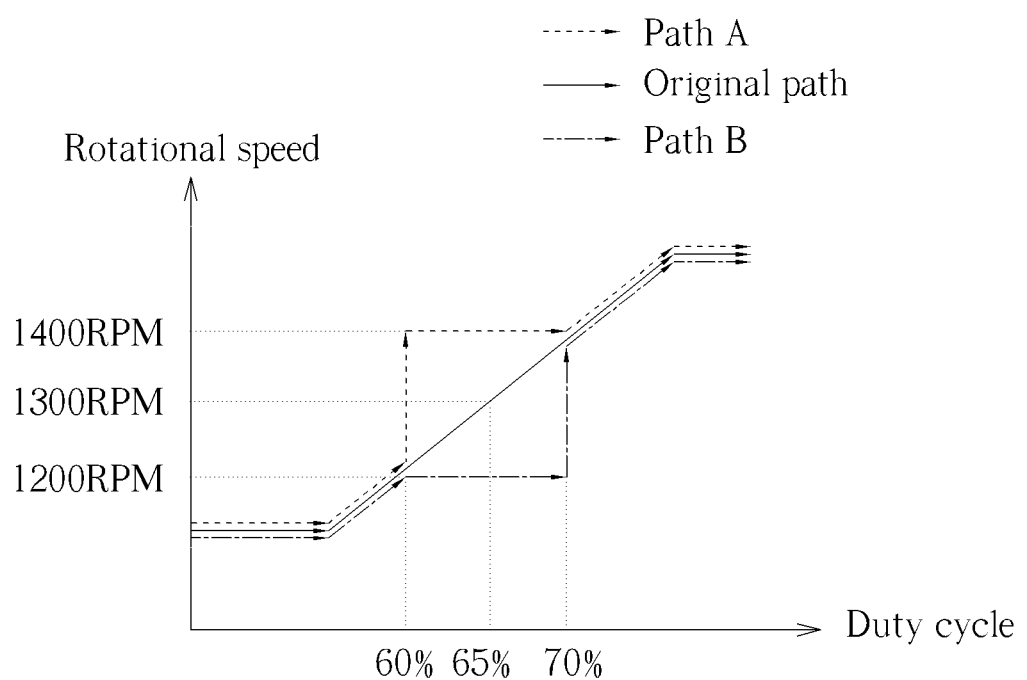
FIG. 5 is a diagram of curve relationship of the rotational speed of the present invention.

Please refer to FIG. 5. FIG. 5 is a diagram of curve relationship of the rotational speed of the present invention. If the resonance rotational speed to be precluded is 1300 RPM (such as the first rotational speed), the first range can be set from 1200 RPM to 1400 RPM for safety, i.e. the rotational speed modulating unit 66 can control the fan driving unit 64 to drive the fan 62 not to rotate at the range between 1200 RPM to 1400 RPM. Please also refer to the relationship table of FIG. 2, it means that the rotational speed will be controlled to rotate outside the range between 1200 RPM to 1400 RPM when temperature of the component detected by the detecting unit 54 is between 54° C. to 58° C. As shown in FIG. 5, an original path is the linear relationship of the rotational speed and the duty cycle of the PWM signal stored by the BIOS 56, and two paths A and B are modulated between 1200 RPM to 1400 RPM. The rotational speed modulating unit 66 can modulate the fan driving unit 64 to drive the fan 62 to rotate at 1400 RPM to skip the first range when the rotational speed is beyond 1200 RPM in the path A. The rotational speed modulating unit 66 can maintain 1400 RPM until 70% of the duty cycle. Then the rotational speed modulating unit 66 recovers to the linear relationship after 1400 RPM. Therefore, the rotational speed will be modulated to 1400 RPM (such as the second rotational speed) within 60% to 70% of the duty cycle. Or in the path B, the rotational speed modulating unit 66 can modulate the fan driving unit 64 to drive the fan 62 to maintain at 1200 RPM when the rotational speed is beyond 1200 RPM. Then the rotational speed modulating unit 66 will recover to the linear relationship after 70% of the duty cycle. Therefore, the rotational speed will be modulated to 1200 RPM (such as the second rotational speed) within 60% to 70% of the duty cycle. Besides, the modulating mechanism can apply similar principle on twice, three times, and even N times of the resonance frequency. Accordingly, multiple exclusion regions can be set for the multiple resonance frequencies. In conclusion, the exclusion region can include a single exclusion region or multiple exclusion regions in one single path of the rotational speed.

Figure 6:
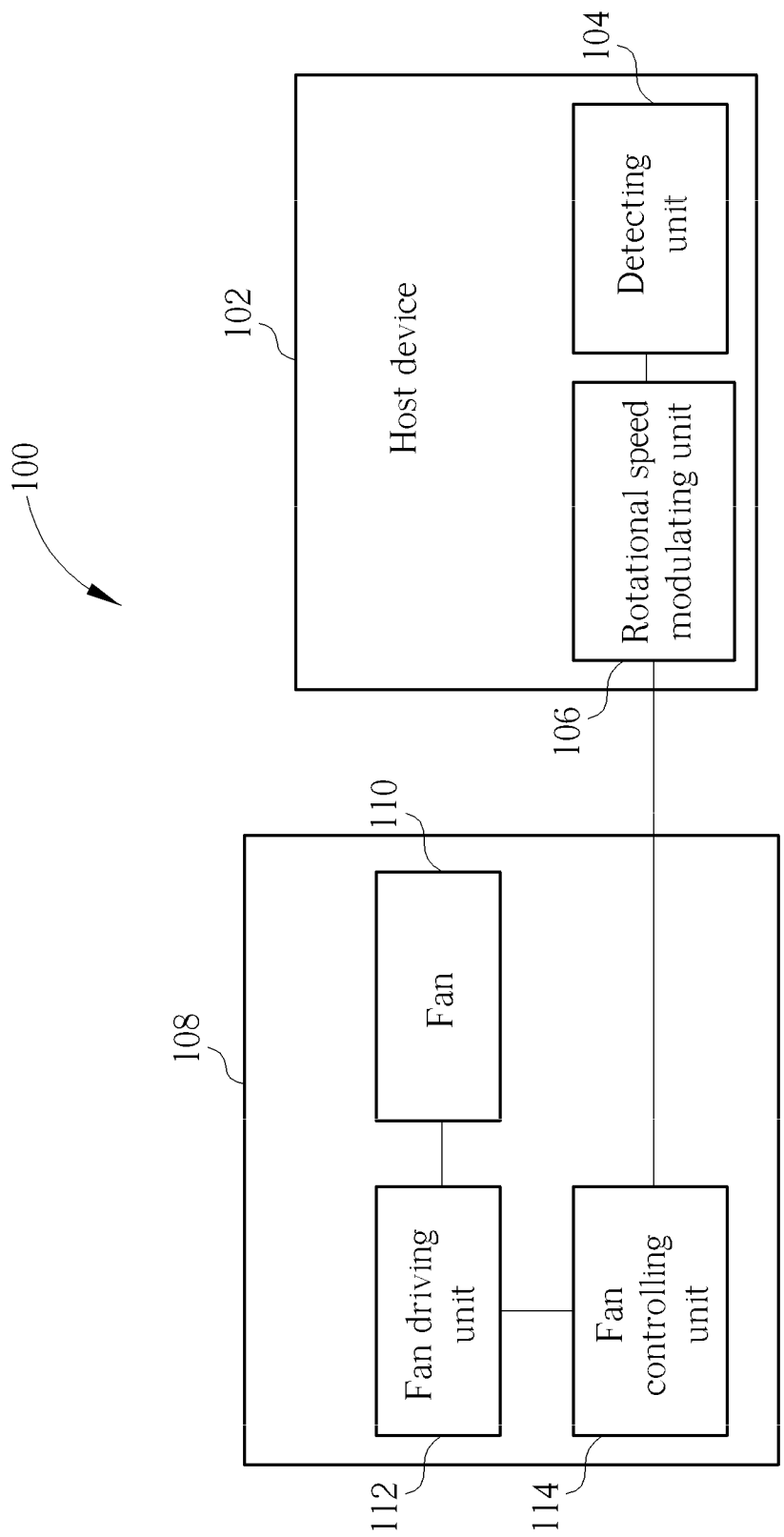
FIG. 6 is a functional block diagram of a fan control system according to a second embodiment of the present invention.

Besides that the modulating mechanism of the rotational speed can be disposed in the fan device, and it also can be disposed in the host device. Please refer to FIG. 6. FIG. 6 is a functional block diagram of a fan control system 100 according to a second preferred embodiment of the present invention. The fan control system 100 includes a host device 102. The host device 102 can be a computer host device. The host device 102 includes a detecting unit 104 to generate a detecting signal. For example, the detecting unit 104 can be a temperature detecting unit for detecting temperature of a component so as to generate a temperature detecting signal. The host device 102 further includes a rotational speed modulating unit 106 coupled to the detecting unit 104 for storing relationship information between the detecting signal and a rotational speed, and the relationship information can be designed as a single exclusion region or multiple exclusion regions corresponding to the aforesaid embodiment. The rotational speed modulating unit 106 generates a rotational signal according to the detecting signal and the relationship information, and the rotational signal can be a PWM signal with a duty cycle. The rotational speed modulating unit 106 can be a baseboard management controller (BMC) installed on a main board. The difference between the first embodiment and the second embodiment is that the programmed rotational speed modulating unit 106 is disposed in the host device 102. Therefore, the rotational speed is modulated by the host device 102, not the fan device 60 mentioned in the aforesaid embodiment. The arrangement of the rotational speed modulating unit can be disposed in the host device 102 or in the fan device 60, and it depends on practical design demands.

The fan control system 100 further includes a fan device 108 for dissipating heat generated by inner components of the host device 102. The fan device 108 is coupled to the rotational speed modulating unit 106. The fan device 108 includes a fan 110 and a fan driving unit 112 for driving the fan 110. The fan driving unit 112 can be a motor. The fan device 108 further includes the fan controlling unit 114 for controlling the fan driving unit 64 to drive the fan 110 to rotate. The fan controlling unit 114 control the fan driving unit 112 to drive the fan 110 to rotate according to the duty cycle of the PWM signal when the fan controlling unit 114 receives the PWM signal.

Similar to the first embodiment, the detecting unit 54 can detect a component so as to generate a detecting signal to the rotational speed modulating unit 106. For example, the detecting unit 54 can detect temperature of a CPU or a key component so as to generate a temperature detecting signal. After the rotational speed modulating unit 106 receives the detecting signal, the rotational speed modulating unit 106 can generate a rotational signal according to the detecting signal and the relationship information. For example, the rotational speed modulating unit 106 can store the relationship information of the detecting signal, the rotational speed, and the duty cycle of the PWM signal, so the rotational speed modulating unit 106 can generate the PWM signal with the duty cycle according to the detecting temperature. The PWM signal generated by the rotational speed modulating unit 106 is a corresponding signal of modulating the rotational speed. For example, when the resonance rotational speed to be precluded is within a first range, the rotational speed of the fan 110 can be set to exclude the first range, such as excluding the upper and lower 10% range of the resonance rotational speed. When the rotational speed corresponding to the detecting signal according to the relationship information is within the first range, the duty cycle of the PWM signal generated by the rotational speed modulating unit 106 is outside duty cycle range corresponding to the first range. The fan controlling unit 114 controls the fan driving unit 112 to drive the fan 110 to rotate at a second rotational speed, and the second rotational speed is outside the first range. The second rotational speed can be corresponding to one of the two boundary values of the first range. For example, the rotational speed modulating unit 106 can modulate the rotational speed to 1400 RPM to skip the first range (from 1200 RPM to 1400 RPM) when the rotational speed is beyond 1200 RPM, i.e. temperature detected by the detecting unit 54 is beyond 54° C. The rotational speed modulating unit 106 can control the rotational speed to maintain at 1400 RPM until temperature detected by the detecting unit 54 is higher than 58° C. corresponding to the rotational speed of 1400 RPM. The rotational speed modulating unit 106 recovers to the linear relationship after 1400 RPM. Therefore, the rotational speed modulating unit 106 generates 70% of the duty cycle of PWM signal within the first range. Or the rotational speed modulating unit 106 can be designed to control the rotational speed to maintain at 1200 RPM when the rotational speed is beyond 1200 RPM. The rotational speed modulating unit 106 recovers to the linear relationship after temperature detected by the detecting unit 54 is higher than 58° C. corresponding to the rotational speed of 1400 RPM. Therefore, the rotational speed modulating unit 106 generates 60% of the duty cycle of PWM signal within the first range. Accordingly, the present invention can prevent resonance due to overlap between vibration frequency of the fan in some specific rotational speeds and natural frequency of the computer casing or of vibration frequency of the fan coupling with the rotational frequency of a hard disk.

In contrast to the prior art, the present invention provides the fan control system capable of modulating the rotational speed of the fan to prevent specific resonance frequency and the method thereof so as to prevent resonance due to overlap between vibration frequency of the fan in some specific rotational speeds and natural frequency of the computer casing or of vibration frequency of the fan coupling with the rotational frequency of the hard disk, such that it increases operational stability of the computer system.

Those skilled in the art will readily observe that numerous modifications and alterations of the device and method may be made while retaining the teachings of the invention.

What is claimed is:

1. A fan control system comprising:
   a host device comprising:
      a detecting unit for detecting a component so as to generate a detecting signal;
      a Basic Input/Output System (BIOS) coupled to the detecting unit for storing relationship information between the detecting signal and a rotational speed of a fan and for generating a rotational signal according to the detecting signal and the relationship information; and
      an output interface coupled to the BIOS for transmitting the rotational signal; and
   a fan device coupled to the output interface, the fan device comprising:
      a fan;
      a fan driving unit for driving the fan; and
      a rotational speed modulating unit for controlling the fan driving unit to drive the fan to rotate at a second rotational speed outside a first range when determining that the rotational signal corresponds to a first rotational speed within the first range according to the relationship information.

2. The fan control system of claim 1, wherein the detecting unit is a temperature detecting unit for detecting temperature of the component so as to generate a temperature detecting signal.

3. The fan control system of claim 1, wherein the rotational signal is a pulse width modulation (PWM) signal with a duty cycle.

4. The fan control system of claim 3, wherein the BIOS is for generating the PWM signal with the duty cycle according to the detecting signal and the relationship information.

5. The fan control system of claim 4, wherein the rotational speed modulating unit is for controlling the fan driving unit to drive the fan to rotate at the second rotational speed when the duty cycle of the PWM signal is within a duty cycle range corresponding to two boundary values of the first range.

6. The fan control system of claim 5, wherein the second rotational speed is corresponding to one of the two boundary values of the first range.

7. The fan control system of claim 4, wherein the BIOS is for storing the relationship information of the detecting signal, the rotational speed, and the duty cycle of the PWM signal.

8. The fan control system of claim 1, wherein the rotational speed modulating unit is a micro controller unit (MCU).

9. A fan control system comprising:
   a host device comprising:
      a detecting unit for detecting a component so as to generate a detecting signal; and
      a rotational speed modulating unit coupled to the detecting unit for storing a relationship information between the detecting signal and a rotational speed and for generating a rotational signal when determining that the rotational speed corresponding to the detecting signal according to the relationship information is within a first range; and
   a fan device coupled to the rotational speed modulating unit, the fan device comprising:
      a fan;
      a fan driving unit for driving the fan; and
      a fan controlling unit for controlling the fan driving unit to drive the fan to rotate at a second rotational speed outside the first range according to the rotational signal generated by the rotational speed modulating unit.

10. The fan control system of claim 9, wherein the detecting unit is a temperature detecting unit for detecting temperature of the component so as to generate a temperature detecting signal.

11. The fan control system of claim 9, wherein the rotational signal is a PWM signal.

12. The fan control system of claim 11, wherein the rotational speed modulating unit is for generating the PWM signal with a duty cycle according to the detecting signal and the relationship information, and the duty cycle of the PWM signal is outside a duty cycle range corresponding to the first range.

13. The fan control system of claim 12, wherein the second rotational speed is corresponding to one of two boundary values of the first range.

14. The fan control system of claim 12, wherein the rotational speed modulating unit is for storing the relationship information of the detecting signal, the rotational speed, and the duty cycle of the PWM signal.

15. The fan control system of claim 9, wherein the rotational speed modulating unit is a baseboard management controller (BMC).

16. A method for modulating a rotational speed of a fan, the method comprising:
   a detecting unit detecting a component so as to generate a detecting signal;
   generating a rotational signal when determining that a first rotational speed corresponding to the detecting signal is within a first range; and driving a fan to rotate at a second rotational speed according to the rotational signal, wherein the second rotational speed is outside the first range.

17. The method of claim 16, wherein the detecting unit detecting the component so as to generate the detecting signal comprises the detecting unit detecting temperature of the component so as to generate a temperature detecting signal.

18. The method of claim 16, wherein the rotational signal is a PWM signal with a duty cycle.

19. The method of claim 18, further comprising driving the fan to rotate at the second rotational speed when the duty cycle of the PWM signal is within a duty cycle range corresponding to two boundary values of the first range.

20. The method of claim 19, wherein the second rotational speed is corresponding to one of the two boundary values of the first range.

* * * * *